(12) United States Patent
Takayama

(10) Patent No.: US 6,302,497 B1
(45) Date of Patent: Oct. 16, 2001

(54) VEHICLE BRAKE CONTROL SYSTEM

(75) Inventor: Toshio Takayama, Yamanashi-ken (JP)

(73) Assignee: Tokico Ltd., Kanagawa-Ken (JP)

( * ) Notice: Subject to any disclaimer, the term of this patent is extended or adjusted under 35 U.S.C. 154(b) by 0 days.

(21) Appl. No.: 09/272,213

(22) Filed: Mar. 19, 1999

(30) Foreign Application Priority Data

Mar. 31, 1998 (JP) ................................. 10-087759

(51) Int. Cl.$^7$ ........................................... B60T 8/44
(52) U.S. Cl. ........................ 303/114.1; 303/113.3
(58) Field of Search .............................. 303/113.3, 114.3, 303/113.4, 114.1, 114.2, DIG. 3, 116.1; 60/547, 547.1, 545

(56) References Cited

U.S. PATENT DOCUMENTS

| | | | |
|---|---|---|---|
| 4,057,301 | * | 11/1977 | Foster .................................. 303/114.1 |
| 4,168,867 | * | 9/1979 | Ando et al. ......................... 303/115.1 |
| 5,031,970 | * | 7/1991 | Vogel .................................. 303/114.1 |
| 5,078,457 | * | 1/1992 | Rittmaqnnsberger et al. ... 303/113.3 |
| 5,094,080 | * | 3/1992 | Gautier et al. ....................... 60/547.1 |
| 5,098,170 | * | 3/1992 | Watanabe ............................ 303/113.3 |
| 5,176,433 | * | 1/1993 | Byrnes et al. ....................... 303/133.3 |
| 5,178,441 | * | 1/1993 | Heibel et al. ....................... 303/114.3 |
| 5,388,897 | * | 2/1995 | Yared et al. ........................ 303/113.2 |
| 5,709,437 | * | 1/1998 | Schluter et al. .................... 303/113.4 |
| 5,746,057 | * | 5/1998 | Shim ...................................... 60/545 |
| 5,890,775 | * | 4/1999 | Tsubouchi et al. ................ 303/114.3 |
| 5,975,648 | * | 11/1999 | Rump ........................................ 303/3 |
| 6,019,439 | | 2/2000 | Drumm et al. . |
| 6,076,897 | * | 6/2000 | Binder et al. ...................... 303/116.1 |

FOREIGN PATENT DOCUMENTS

| | | |
|---|---|---|
| 44 38 722 | 5/1996 | (DE) . |
| 196 16 495 | 11/1996 | (DE) . |
| 4-262957 | 9/1992 | (JP) . |
| 7-503214 | 4/1995 | (JP) . |
| 7-506785 | 7/1995 | (JP) . |

* cited by examiner

Primary Examiner—Robert J. Oberleitner
Assistant Examiner—Devon Kramer
(74) Attorney, Agent, or Firm—Wenderoth, Lind & Ponack, L.L.P.

(57) ABSTRACT

A vehicle brake control system includes a brake booster divided into a constant pressure chamber permanently communicating with a vacuum source, and a variable pressure chamber selectively communicating with the constant pressure chamber. The brake booster includes a first servo mechanism designed to develop a differential pressure between the two chambers, and a second servo mechanism. A master cylinder is operatively connected to the brake booster to create hydraulic pressure in response to the output of the brake booster, and hydraulic lines connect the master cylinder and the wheel cylinders. Pressure charging valves allow and block communication between the master and the wheel cylinders. Pressure relief valves between the pressure charging valves and the wheel cylinders selectively release the hydraulic pressure from the hydraulic lines. A controller controls the second servo mechanism, the pressure charging valves and the pressure relief valves, and is operable to cause the second servo mechanism to develop a differential pressure between the two chambers.

4 Claims, 9 Drawing Sheets

VEHICLE BRAKE CONTROL SYSTEM

BACKGROUND OF THE INVENTION

The present invention relates to a vehicle brake control system capable of producing different degrees of braking force in response to the input of a brake foot pedal.

A known vehicle brake control system is operable to produce a braking force even when a brake pedal is not depressed and develop a braking force greater than a force normally obtained when the brake pedal is depressed. Such a conventional brake control system is adapted to provide traction control (TCS) and vehicle dynamic control (VDC). In the traction control mode, a controller receives information typically on wheel speed and wheel cylinder brake pressure, provided that the input of the brake pedal is absent, and brings brake pressure in wheel cylinders to the desired level so as to avoid wheel spin. In the vehicle dynamic control mode, the controller receives information typically on the actual yaw rate, lateral acceleration and steering wheel angle (or position), regardless of whether or not the input of the brake pedal is available, and brings the yaw rate to the desired rate. Conventionally, a mechanical pump is employed to increase brake pressure in the wheel cylinders. The system as a whole is thus costly.

Accordingly, it is an object of the present invention to provide a vehicle brake control system which does not require a mechanical pump to increase wheel cylinder brake pressure and is thus economical to manufacture.

SUMMARY OF THE INVENTION

According to a feature of the present invention, there is provided a brake control system comprising a brake booster including a power piston assembly by which the interior of the brake booster is divided into a constant pressure chamber and a variable pressure chamber selectively communicating with the constant pressure chamber. A first servo mechanism is designed to develop a differential pressure between the constant pressure chamber and the variable pressure chamber in response to operation (depression) of a brake pedal to produce a force corresponding to the amount of depression of the brake pedal. A second servo mechanism is also provided. A master cylinder is operatively connected to the brake booster to create hydraulic pressure in response to the output of the brake booster, and a plurality of wheel cylinders are provided for applying a braking force to respective wheels in response to the hydraulic pressure. A plurality of hydraulic lines is connected between the master cylinder and the wheel cylinders, and a plurality of corresponding pressure charging valves are provided in the hydraulic lines to allow and block communication between the master cylinder and the wheel cylinders. A plurality of pressure relief valves are provided in the hydraulic lines between the pressure charging valves and the wheel cylinders to selectively release hydraulic pressure from the hydraulic lines, and a controller is also provided and designed to control the second servo mechanism, the pressure charging valves and the pressure relief valves. The controller is operable to cause the second servo mechanism to develop a differential pressure between the constant pressure chamber and the variable pressure chamber, regardless of whether or not the brake pedal is depressed, to thereby produce a force greater than that corresponding to the amount of operation of the brake pedal.

With the pressure charging valves open, and the pressure relief valves closed, the controller is operable to control the second servo mechanism to produce an output force greater than a force normally developed in response to the output of the brake pedal. This causes the master cylinder to create hydraulic pressure greater than that corresponding to the degree of pedal depression. This results in an increase in the hydraulic pressure in the wheel cylinders. On the other hand, the hydraulic pressure in the wheel cylinders is reduced if the same control is made, but with the pressure charging valves closed, and the pressure relief valves open. This arrangement eliminates the need for a mechanical pump to increase hydraulic pressure in the wheel cylinders.

In a preferred mode, the controller is operable to control the brake booster, with any of the pressure charging valves for wheels which are not in control mode being closed, so as to cause the second servo mechanism to produce a force greater than a force normally developed in response to the output of the brake pedal, and control any of the pressure charging valves and the pressure relief valves for wheels in control mode so as to cause corresponding wheel cylinders to apply a braking force to the wheels in control mode.

In one embodiment, master cylinder hydraulic pressure sensors are connected to the controller and adapted to sense hydraulic pressure in the master cylinder. The controller controls the brake booster so that the hydraulic pressure as sensed by the master cylinder hydraulic pressure sensors is greater than hydraulic pressure required by the wheel cylinders by a predetermined amount. Advantageously, the hydraulic pressure in the wheel cylinders can be increased simply by control of the pressure charging valves and pressure relief valves. This prevents hydraulic pressure in the master cylinder from dropping and also avoids undue stress on various parts of the system such as pipe joints and seals.

In one exemplary embodiment, accumulators are provided to receive brake pressure released from the wheel cylinders through the pressure relief valves. Check valves may be connected to bypass the pressure relief valves and allow flow of brake fluid only from the accumulators to the master cylinder. In this way, the hydraulic pressure as introduced into the accumulators is returned to the master cylinder when the hydraulic pressure in the master cylinder becomes less than that in the accumulators. The pressure relief valves may be opened when the hydraulic pressure in the wheel cylinders is less than a predetermined level. This arrangement enables the brake pressure as introduced into the accumulators to be returned to the master cylinder without the need for the check valves.

Preferably, a brake fluid reservoir is connected to the master cylinder and adapted to receive hydraulic pressure released through the pressure relief valves. This arrangement eliminates the need for an accumulator to release hydraulic pressure from the wheel cylinders.

BRIEF DESCRIPTION OF THE DRAWINGS

The above and other objects, features and advantages will become apparent from a consideration of the following description of preferred embodiments when taken in conjunction it the accompanying drawings, in which.

DETAILED DESCRIPTION OF THE INVENTION

Figure 1:
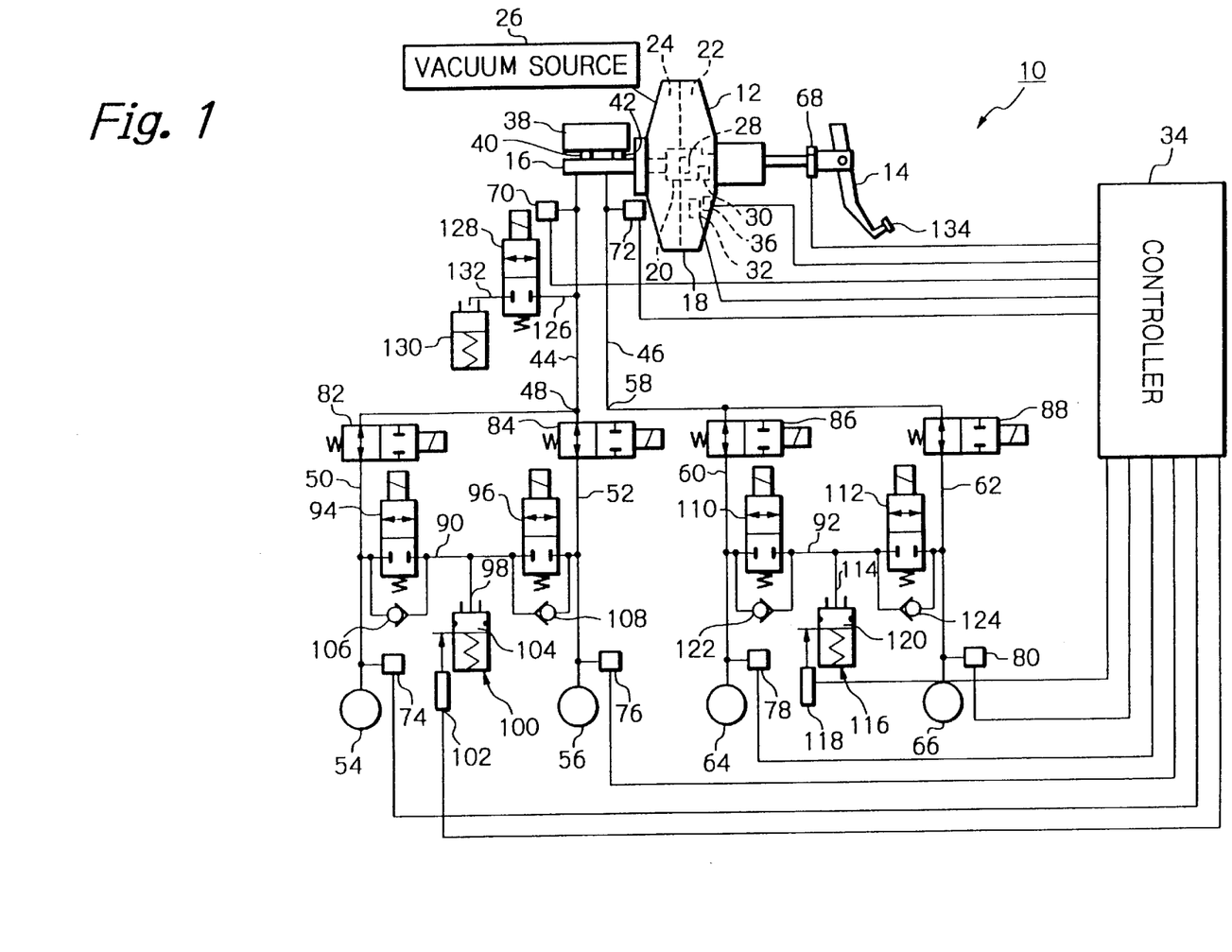
FIG. 1 is a general schematic of a vehicle brake control system according to one embodiment of the present invention.

Referring now to FIG. 1, there is illustrated a vehicle brake control system made according to one embodiment of the present invention and generally designated as 10. The brake control system 10 includes a brake booster 12 connected to a brake pedal 14 and a master cylinder 16.

As schematically shown in FIG. 1, the brake booster 12 includes a casing 18 divided by a power piston assembly 20 into a variable pressure chamber 22 and a constant pressure chamber 24 which permanently communicates with a vacuum source 26 such as the intake manifold of a vehicle engine. The power piston assembly 20 includes a vacuum valve 28 for allowing and interrupting communication between the constant pressure chamber 24 and the variable pressure chamber 22, and includes a control valve 30 for admitting atmospheric pressure to the variable pressure chamber 22. Initially, the two chambers 22, 24 are held in a state of balance, and power assistance is provided by allowing atmospheric air to reach the variable pressure chamber (or working chamber) 22 in order to urge the power piston assembly 20 in a direction toward the master cylinder 16. Details of such a pressure differential operated brake booster are disclosed in Japanese patent disclosure No. 7-503214, Japanese patent disclosure No. 7-506785 and Japanese laid-open patent publication No. 4-262957. The contents of these publications are incorporated herein by reference. According to the present invention, the brake booster 12 additionally includes a solenoid valve 32 for blocking communication between the two chambers 22, 24 and for admitting atmospheric pressure into the variable pressure chamber 22. The solenoid valve 32 is connected to an electronic controller 34 which will later be described in detail. A suitable release switch 36 is provided within the casing 18 so as to detect operation of the brake pedal 14. Details of such a release switch is also disclosed in Japanese patent disclosure No. 7-503214, the contents of which is incorporated herein by reference.

The master cylinder 16 is, for example, a tandem type wherein hydraulic pressure is created through movement of two pistons (not shown) within two corresponding hydraulic chambers (not shown). A brake fluid reservoir 38 is connected to the two hydraulic chambers through conduits 40, 42. Two hydraulic lines (brake circuits) 44, 46 emerge from the master cylinder 16 in order to supply hydraulic pressure created through movement of the respective pistons in the master cylinder 16. The hydraulic line 44 is divided at a suitable connection 48 into two hydraulic lines (brake circuits) 50, 52 which are connected to two respective wheel cylinders 54, 56. The hydraulic line 46 is also divided at a suitable connection 58 into two hydraulic lines (brake circuits) 60, 62 which are connected to two respective wheel cylinders 64, 66.

The electronic controller 34 is connected to various sensors and is responsive to their outputs. Specifically, a brake pedal force sensor 68 is operatively associated with the brake pedal 14 and provides a signal that is a measure of an operator applied brake pedal force. A master cylinder hydraulic pressure sensor 70 is provided in the line 44 to sense hydraulic pressure in one of the hydraulic pressure chambers in the master cylinder 16. Another master cylinder hydraulic pressure sensor 72 is provided in the line 46 to sense hydraulic pressure in the other hydraulic pressure chamber. Four wheel cylinder hydraulic pressure sensors 74, 76, 78, 80 are provided in the four corresponding lines 50, 52, 60, 62 to sense hydraulic pressure introduced into the respective wheel cylinders 54, 56, 64, 66. The controller 34 receives a feedback signal of sensed hydraulic pressure in the master cylinder 16 from the master cylinder hydraulic pressure sensors 70, 72 to thereby control operation of the brake booster 12. The use of the two master cylinder hydraulic pressure sensors 70, 72 provides a fail safe arrangement, and one of the sensors 70, 72 may be omitted.

When the solenoid valve 32 is deenergized, the brake booster 12 is operable to augment the force applied by the brake pedal at a normal boost rate. When the brake pedal 14 is depressed, the valves 28, 30 of the brake booster 12 are operated to admit atmospheric pressure into the variable pressure chamber 22. The amount of the pressure introduced into the variable pressure chamber 22 is proportional to the amount of force applied during depression of the brake pedal 14. With the air within the variable pressure chamber 22, a pressure differential is developed between the two chambers 22, 24. This pressure differential is utilized to advance the power piston assembly 20 and increase the total degree of application of the brakes at a normal boost rate. Hydraulic pressure is produced in the master cylinder 16 in response to the output of the brake booster 12.

When the controller 34 is activated to energize the solenoid valve 32, the valves 28, 30 are operated to admit atmospheric pressure into the variable pressure chamber 22. The amount of air introduced into the variable pressure chamber 22 is more than that in the previous case. A greater pressure differential is developed between the two chambers 22, 24 to augment the force applied by the brake pedal at a greater boost rate or provide a greater degree of power assist. As compared to the previous case, a higher level of hydraulic pressure is created in the master cylinder 16 in response to the output of the brake booster 12.

When the brake pedal 14 is released with the solenoid valve 32 in its inoperative state, the valves 28, 30 of the brake booster 12 are operated to allow communication between the constant pressure chamber 24 and the variable pressure chamber 22. This results in a decrease in the difference in pressure between the two chambers 22, 24, causing a corresponding decrease in hydraulic brake pressure in the master cylinder 16.

On the other hand, when the brake pedal 14 is released with the solenoid valve 32 in its operative state, the release switch 36 is operable to sense the released condition of the brake pedal 14 and sends a corresponding signal to the controller 34. The controller 34 is then operated to deenergize the solenoid valve 32. As a result, the difference in pressure between the two chambers 22, 24 is decreased and thus, hydraulic brake pressure in the master cylinder 16 decrease.

With the solenoid valve 32 in its operative state, the brake booster 12 is capable of providing more power assist than normally provided when the solenoid valve 32 is deenergized. The brake booster 12 receives the output of the master cylinder hydraulic pressure sensors 70, 72 and brings hydraulic pressure in the master cylinder 16 to the desired level.

As an important feature of the present invention, the vacuum valve 28 and the control valve 30 collectively form a first servo mechanism whereby a normal degree of pressure differential is developed between the two chambers 22, 24 in order for the brake booster 12 to augment the force applied by the brake pedal 14 at a normal boost rate. Also, the vacuum valve 28, the control valve 30, and the solenoid valve 32 collectively form a second servo mechanism whereby a greater degree of pressure differential is developed between the two chambers 22, 24, regardless of whether or not the brake pedal 14 is depressed, so that the brake booster 12 may augment the force applied by the brake pedal 14 at a greater boost rate.

Two normally open electromagnet valves or pressure charging valves 82, 84 are provided in the lines 50, 52, respectively. Similarly, two normally open pressure charging valves 86, 88 are provided in the lines 60, 62, respectively. A line 90 extends between the lines 50, 52 between the pressure charging valves 82, 84 and the corresponding wheel cylinders 54, 56. Similarly, a line 92 extends between the lines 60, 62 between the pressure charging valves 86, 88 and the corresponding wheel cylinders 64, 66.

Two normally closed electromagnet valves or pressure relief valves 94, 96 are provided in the line 90. A branch 98 of the line 90 is connected to a low pressure accumulator 100. A stroke sensor 102 is operatively associated with the accumulator 100 so as to provide a signal that is a measure of the amount of brake fluid introduced into the accumulator in response to stroke or displacement of a piston 104 within the accumulator 100. A check valve 106 is provided in the line 90 in a manner to bypass the pressure relief valve 94 and is operable to allow the flow of brake fluid only from the accumulator 100 to the line 50. Similarly, a check valve 108 is provided in the line 90 in a manner to bypass the pressure relief valve 96 and is operable to allow the flow of brake fluid only from the accumulator 100 to the line 52.

Two normally closed electromagnet valves or pressure relief valves 110, 112 are provided in the line 92. A branch 114 of the line 92 is connected to a low pressure accumulator 116. A stroke sensor 118 is operatively associated with the accumulator 116 so as to provide a signal that is a measure of the amount of brake fluid introduced into the accumulator 116 in response to stroke of a piston 120 within the accumulator 116. A check valve 122 is provided in the line 92 in a manner to bypass the pressure relief valve 110 and is operable to allow the flow of brake fluid only from the accumulator 116 to the line 60. Similarly, a check valve 124 is provided in the line 92 in a manner to bypass the pressure relief valve 112 and is operable to allow the flow of brake fluid only from the accumulator 116 to the line 62.

A branch 126 of the line 44 is connected to a normally closed electromagnet valve or inlet valve 128. A stroke simulator 130 is connected to the inlet valve 128 through a line 132. The stroke simulator 130 is operable to receive brake fluid from the master cylinder 16 and allow a pedal body 134 to move in response to operation of the brake pedal 14 so as to give a "braking feel" to the operator.

In a main routine (not shown), the controller 34 determines whether or not traction control (TCS) is required to prevent wheel spin. This control is performed by controlling hydraulic pressure in the wheel cylinders 54, 56, 64, 66 in response to wheel speed and the actual hydraulic pressure in the wheel cylinders 54, 56, 64, 66, provided that the input of the brake pedal 14 is absent. If the traction control is necessary, the controller 34 calculates the amount of brake pressure required by the wheel cylinders 54, 56, 64, 66.

The controller 34 also determines whether or not vehicle dynamic control (VDC) is required to bring the vehicle yaw rate into conformance with the desired yaw rate. This control is performed by controlling hydraulic pressure in the wheel cylinders 54, 56, 64, 66 in response to the actual yaw rate, lateral acceleration and steering wheel position (or angle), regardless of whether or not the input of the brake pedal 14 is available. If the vehicle dynamic control is necessary, the controller 34 calculates the amount of brake pressure required by the wheel cylinders 54, 56, 64, 66.

Additionally, the controller 34 determines whether or not anti-lock brake control (ABS) is required to prevent wheels from being locked during a brake application. If the answer is in the positive, the controller 34 calculates the amount of brake pressure required by the wheel cylinders 54, 56, 64, 66. Further, the controller 34 determines whether or not it is necessary to control a braking force applied to a particular wheel so as to prevent a spin during braking. If the answer is in the positive, the controller 34 calculates the amount of brake pressure required by the wheel cylinders 54, 56, 64, 66. The controller 34 also determines whether or not it is necessary to cause the brake booster 12 to provide a greater degree of power assistance during an emergency stop.

Figure 2A:
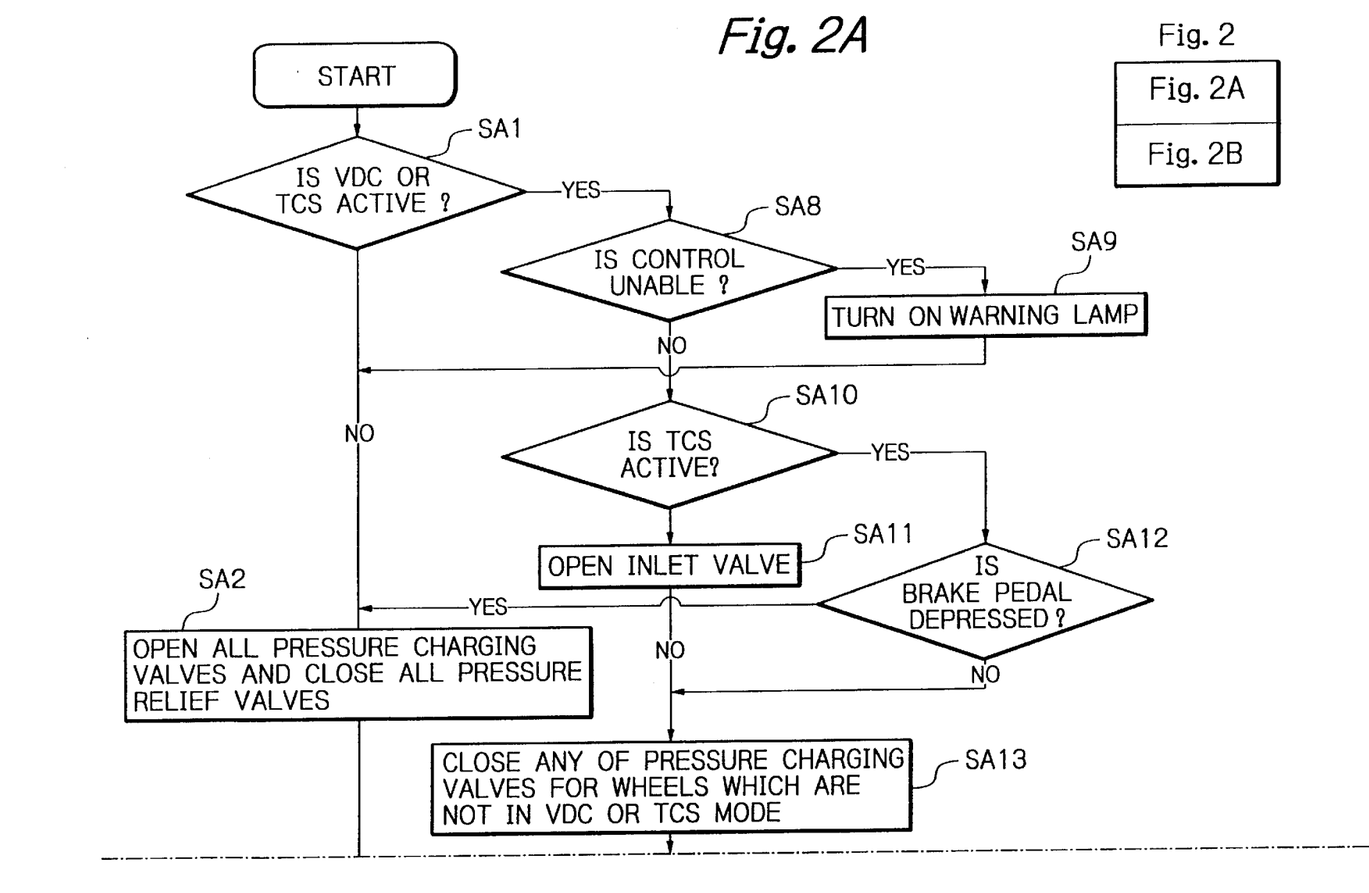
FIG. 2 is a flow chart for control by a controller shown in FIG. 1.
Figure 2B:
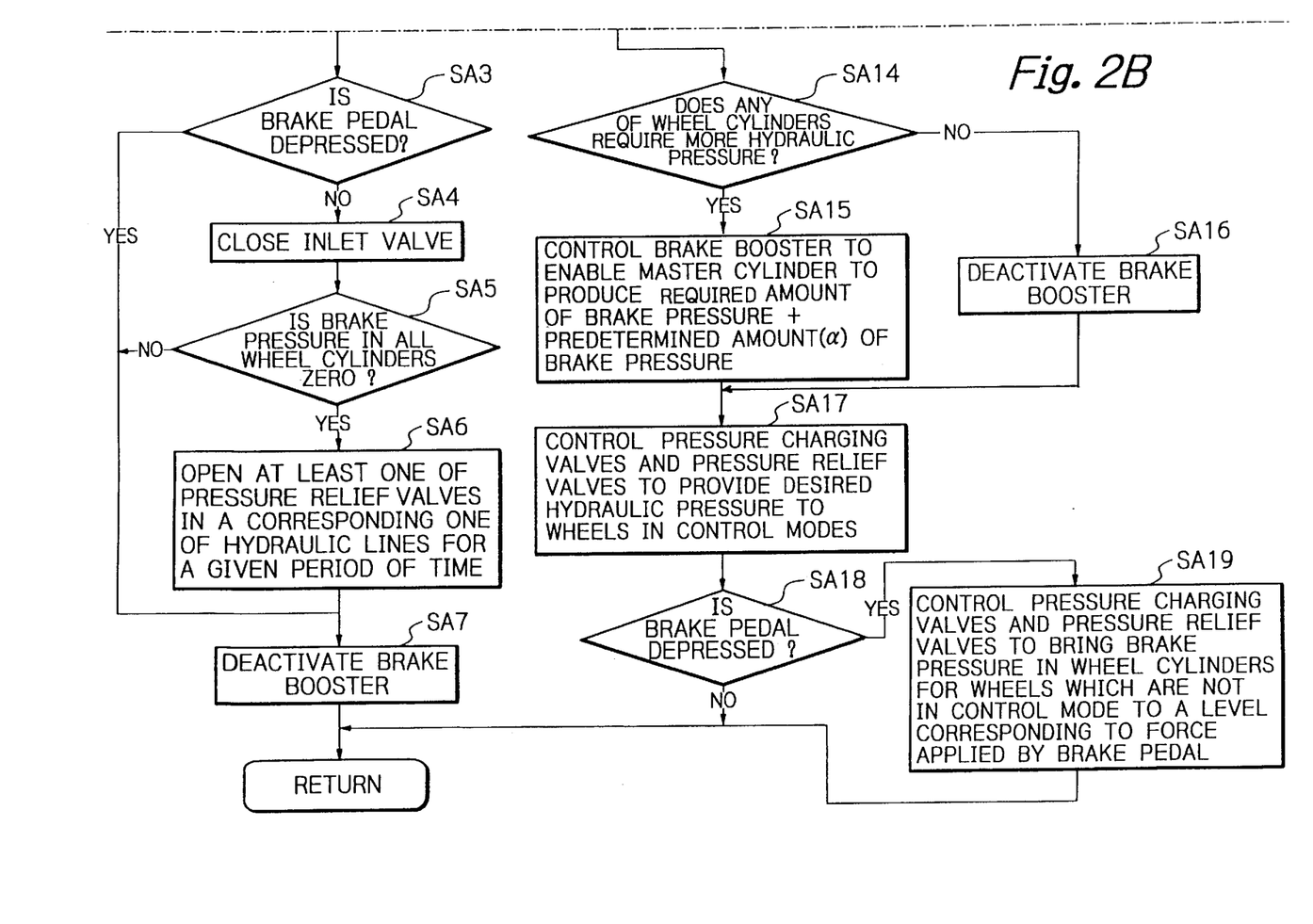

Referring next to FIG. 2, there is illustrated a flow diagram for control by the controller 34. The program starts and moves to a step SA1 where it determines whether or not vehicle dynamic control (VDC) or traction control (TCS) has been effected. If neither control has been effected, the program proceeds to a step SA2 where all the pressure charging valves 82, 84, 86, 88 are placed in their off or open position, and all the pressure relief valves 94, 96, 110, 112 are placed in their off or closed position. This allows communication between the master cylinder 16 and the wheel cylinders 54, 56, 64, 66 and blocks communication between the wheel cylinders 54, 56 and the low pressure accumulator 100 and between the wheel cylinders 64, 66 and the low pressure accumulator 116. As a result, brake pressure developed in the master cylinder 16 is fed directly to the wheel cylinders 54, 56, 64, 66.

Following execution of the step SA2, the program proceeds to a step SA3 where it determines whether or not the brake pedal 14 is depressed by the operator. This determination is based on either the output of the release switch 36 or the brake pedal force sensor 68. If the answer to this question is "YES", the program proceeds to a step SA7 where the brake booster 12 is deactivated so that it acts as a normal servo booster. If at the step SA3, the brake pedal 14 is not depressed, the program proceeds to a step SA4 where the inlet valve 128 is placed in its off position so as to isolate the stroke simulator 130 from the master cylinder 16.

From the step SA4, the program proceeds to a step SA5 where it determines whether or not brake pressure in all the wheel cylinders 54, 56, 64, 66 is at zero pressure. This determination can be made on a basis of the level of brake pressure sensed by the wheel cylinder hydraulic pressure sensors 74, 76, 78, 80 or the time during which the pressure charging valves 82, 84, 86, 88 and the pressure relief valves 94, 96, 110, 112 are opened. If at the step SA5, brake pressure in all the wheel cylinders 54, 56, 64, 66 is at zero pressure, the program proceeds to a step SA6 where based on signals from the stroke sensors 102, 118, at least one of the pressure relief valves 94, 96, 110, 112 is placed in its on or open position so as to release brake fluid from the low pressure accumulators 100, 116. This release continues until the stroke sensors 102, 118 detect no displacement of the pistons 104, 120, or is effected for a given period of time. This time is set on a basis of the time during which the pressure relief valves 94, 96, 110, 112 have been opened. Following execution of the step SA6, the program proceeds to a step SA7 where the solenoid valve 32 is deenergized to render the brake booster 12 inoperative. The brake booster then acts as a normal servo booster. After the step SA7, the program returns to the main routine. If at the step SA5, brake pressure in all the wheel cylinders 54, 56, 64, 66 is not at zero pressure, the program moves to the step SA7 without execution of the step SA6.

The use of the check valves 106, 108, 122, 124 can eliminate the need for execution of the steps SA5 and SA6. It is, however, preferable to execute these steps since any of the check valves may malfunction. Advantageously, execution of the steps SA5 and SA6 eliminates the use of the check valves. This brings about a reduction in the production cost and the number of assembly parts.

If at the step SA1, either vehicle dynamic control or traction control is active, the program proceeds to a step SA8 where it determines whether or not the control at issue is unable to continue. In one example, the control can not be performed when either the low pressure accumulator 100 or the low pressure accumulator 116 is almost completely filled with brake fluid and is unable to reduce the pressure in the corresponding wheel cylinders. The amount of hydraulic pressure in the low pressure accumulators 100, 116 is determined based on the output of the stroke sensors 102, 118 that is a measure of the amount of stroke or displacement of the pistons 104, 120. The controller 34 determines that the control is unavailable when the piston is displaced to a predetermined position, for example, 70 to 90 percent of the full displacement. The controller 34 determines that the control continues to be effected when the piston is displaced to a position below 70 to 90 percent of the full displacement. Alternatively, the controller may determine that the control is unable to continue when the amount of brake fluid in the wheel cylinders to be removed becomes greater than the amount of brake fluid that the corresponding low pressure accumulators are able to receive from the wheel cylinders.

If at the step SA8, the answer is in the positive, the program proceeds to a step SA9 where a warning lamp (not shown) is turned on. After the step SA9, the step SA2 and subsequent steps are executed to deactivate the brake booster 12. If at the step SA8, the answer is in the negative, the program proceeds to a step SA10 where it determines whether or not traction control is active. If the vehicle is in the vehicle dynamic control mode rather than the traction control mode, the program continues to a step SA11 where the inlet valve 128 is opened since the vehicle dynamic control is performed, regardless of whether or not the brake pedal 14 is operated. With the inlet valve 128 open, the master cylinder 16 is in communication with the stroke simulator 130. If on the other hand, the vehicle is in the traction control mode, the program moves to a step SA12 where it determines whether or not the brake pedal 14 is depressed. This determination is based on the output of the release switch 36 or the brake pedal force sensor 68. If at the step SA12 the brake pedal 14 is depressed, the traction control is rendered inactive. The program then executes the step SA12 and subsequent steps.

If the step SA12 determines that the brake pedal 14 is not operated after the inlet valve 128 is opened (step SA11), the program proceeds to a step SA13 where any of the pressure charging valves 82, 84, 86, 88 corresponding to wheels which are neither in the vehicle dynamic control mode nor in the traction control mode are placed in their on or closed position. With those valves closed, the master cylinder 16 is isolated from any of the wheel cylinders corresponding to the wheels in question. As a result, hydraulic pressure within the wheel cylinders in question remains unchanged regardless of activation of the brake booster 12 at a step SA15.

After the step SA13, the program proceeds to a step SA14 where it determines whether or not any of the wheel cylinders corresponding to wheels in the vehicle dynamic control mode or the traction control mode require more pressure or are in a build mode. This determination is based on the level of hydraulic pressure as calculated in the main routine. Alternatively, the step 14 may determine whether or not the wheel cylinders are in a pressure hold mode or in a decay mode.

If at the step SA14, any of the wheel cylinders are in the build mode, the program proceeds to a step SA15 where the master cylinder 16 produces a maximum amount of brake pressure necessary for the wheel cylinders at issue plus a predetermined amount ($\alpha$) of additional brake pressure. This additional brake pressure is to prevent the hydraulic pressure in the master cylinder 16 from dropping when some of the wheel cylinders are moved into a build mode and thus, insure that the master cylinder 16 produces at least a sufficient amount of brake pressure. To this end, the controller 34 receives a feedback indication of hydraulic pressure in the master cylinder 16 as sensed by the master cylinder hydraulic pressure sensors 70, 72 and controls the solenoid valve 32 to enable the master cylinder 16 to produce a sufficient amount of hydraulic pressure.

Advantageously, the additional brake pressure avoids exertion of undue stress on pipe joints, seals of the accumulators and the various valves, and other parts in the hydraulic system. If such a problem does not exist, the brake booster 12 may provide a maximum output. In such a case, the master cylinder hydraulic pressure sensors 70, 72 may be omitted.

If at the step SA14, any of the wheel cylinders 54, 56, 64, 66 is not in the build mode, the program proceeds to a step SA 16 where the solenoid valve 32 is deactivated to render the brake booster 12 inactive. The pistons (not shown) in the master cylinder 16 are then returned to allow supply of brake fluid from the brake fluid reservoir 38 to the master cylinder 16.

After the step SA15 or the step SA 16, the program proceeds to a step SA17 where those pressure charging valves corresponding to wheels in the control modes are closed, whereas the pressure relief valves 94, 96, 110, 112 are operable to reduce or maintain the hydraulic pressure in the wheels in the control modes. In this state, the wheel cylinders have no effect on the hydraulic pressure in the master cylinder. As such, brake fluid can be fed from the brake fluid reservoir 38 to the master cylinder 16 by returning the pistons (step SA16). If in the previous control cycle, the second servo mechanism is activated, the solenoid valve is reset at the step SA16. If a build up of pressure is required in the subsequent control cycles, the second servo mechanism can be reactivated to allow the brake fluid reservoir 38 to feed brake fluid to the master cylinder 16 (at this time, the power piston assembly 20 is returned to its initial position when the vehicle is in a traction control mode, and returned to a position corresponding to depression of the brake pedal 14).

At the step SA17, the controller 34 receives a feedback indication of hydraulic pressure as sensed by the wheel cylinder hydraulic pressure sensors 74, 76, 78, 80 and controls any of the pressure charging valves and the pressure relief valves corresponding to wheels in the control modes so as to obtain the desired brake pressure. Alternatively, the level of hydraulic pressure may be determined based on the time during which the pressure charging valves and the pressure relief valves have been opened. In such a case, the wheel cylinder hydraulic pressure sensors 74, 76, 78, 80 may be omitted.

To reduce the hydraulic pressure in any of the wheel cylinders 54, 56, 64, 66 corresponding to wheels in the control modes, the corresponding pressure charging valve is placed in its on position so as to block communication between the master cylinder 16 and the wheel cylinders in question. The corresponding pressure relief valve is also placed in its on position so as to allow brake fluid to flow from the wheel cylinders in question to a corresponding one of the low pressure accumulators 100, 116. This results in a reduction in hydraulic pressure in the wheel cylinders in question.

To maintain the hydraulic pressure in any of the wheel cylinders 54, 56, 64, 66 corresponding to wheels in the control modes, the corresponding pressure charging valve is placed in its on position so as to block communication between the master cylinder 16 and the wheel cylinders in question. The corresponding pressure relief valve is also placed in its off position so as to block communication between the wheel cylinders in question and a corresponding one of the low pressure accumulators 100, 116.

To increase the hydraulic pressure in any of the wheel cylinders 54, 56, 64, 66 corresponding to wheels in the control modes, the corresponding pressure charging valve is placed in its off position so as to allow communication between the master cylinder 16 and the wheel cylinders in question. The corresponding pressure relief valve is also placed in its off position so as to block communication between the wheel cylinders in question and a corresponding one of the low pressure accumulators 100, 116. This results in an increase in hydraulic pressure in the wheel cylinders in question.

After the step SA17, the program proceeds to a step SA18 where it determines whether or not the take pedal 14 is depressed. This determination is based on the output of the release switch 36 or the brake pedal force sensor 68. If at the step SA17 the brake pedal is depressed, that is, the vehicle dynamic control is active, the program proceeds to a step SA19 where the controller 34 receives a feedback indication of hydraulic pressure in any of the wheel cylinders corresponding to wheels which are not in a control mode, as sensed by the corresponding wheel cylinder hydraulic pressure sensors, and controls the corresponding pressure charging valve 82, 84, 86, 88 and corresponding pressure relief valve 94, 96, 110, 112 to bring the brake pressure to a level corresponding to the force applied by the brake pedal 14. Also, the same level of hydraulic pressure is fed to the other wheel cylinders. Alternatively, the hydraulic pressure may be determined based on the time during which the pressure charging valves 82, 84, 86, 88 and the pressure relief valves 94, 96, 110, 112 have been opened. At the step SA19, the controller 34 may control the pressure charging valves 82, 84, 86, 88 and the pressure relief valves 94, 96, 110, 112 so that the addition of braking force to wheels in the control mode and braking force to the other wheels is equal to the force applied by the brake pedal 14. After the step SA19, the program returns to the main routine. If at the step SA18, pedal depression is absent, the program also returns to the main routine.

It is to be understood that the brake control system also controls the pressure charging valves 82, 84, 86, 88 and the pressure relief valves 94, 96, 110, 112 to provide antilock brake control and independent control of brake force to the wheels in addition to traction control and vehicle dynamic control. Furthermore, the brake control system enables the brake booster to augment the force applied by the brake pedal 14 or provide power assist during an emergency stop.

In this embodiment, if in the vehicle dynamic control and traction control modes, the brake booster 12 produces a force more than a force normally obtained in response to the input (including zero input) of the brake pedal 12 with the pressure charging valves 82, 84, 86, 88 open and the pressure relief valves 94, 96, 110, 112 closed, the master cylinder 16 creates hydraulic pressure more than that normally obtained in response to the input of the brake pedal 14 to thereby increase brake fluid pressure in the wheel cylinders 54, 56, 64, 66. If, on the other hand, the pressure charging valves 82, 84, 86, 88 are closed, and the pressure relief valves 94, 96, 110, 112 are open, the master cylinder 16 reduces brake fluid pressure in the wheel cylinders 54, 56, 64, 66. In this way, the system does not require a mechanical pump to increase brake fluid pressure in the wheel cylinders 54, 56, 64, 66.

The low pressure accumulators 100, 116 are provided to receive hydraulic pressure through the pressure relief valves 94, 96, 110, 112. This arrangement enables brake fluid to be readily discharged to the master cylinder 16.

The second servo mechanism is operable to deactivate the brake booster 12 when all the wheels in control mode are in a pressure decay or hold mode. The controller also closes any of the pressure charging valves 82, 84, 86, 88 corresponding to wheels which are not in a control mode as well as any other pressure charging valves corresponding to wheels in control mode so as to enable brake fluid to be fed from the brake fluid reservoir 38 to the master cylinder 16. With this arrangement, the second servo mechanism is capable of full operation in a next control cycle when build of pressure is required.

Figure 3:
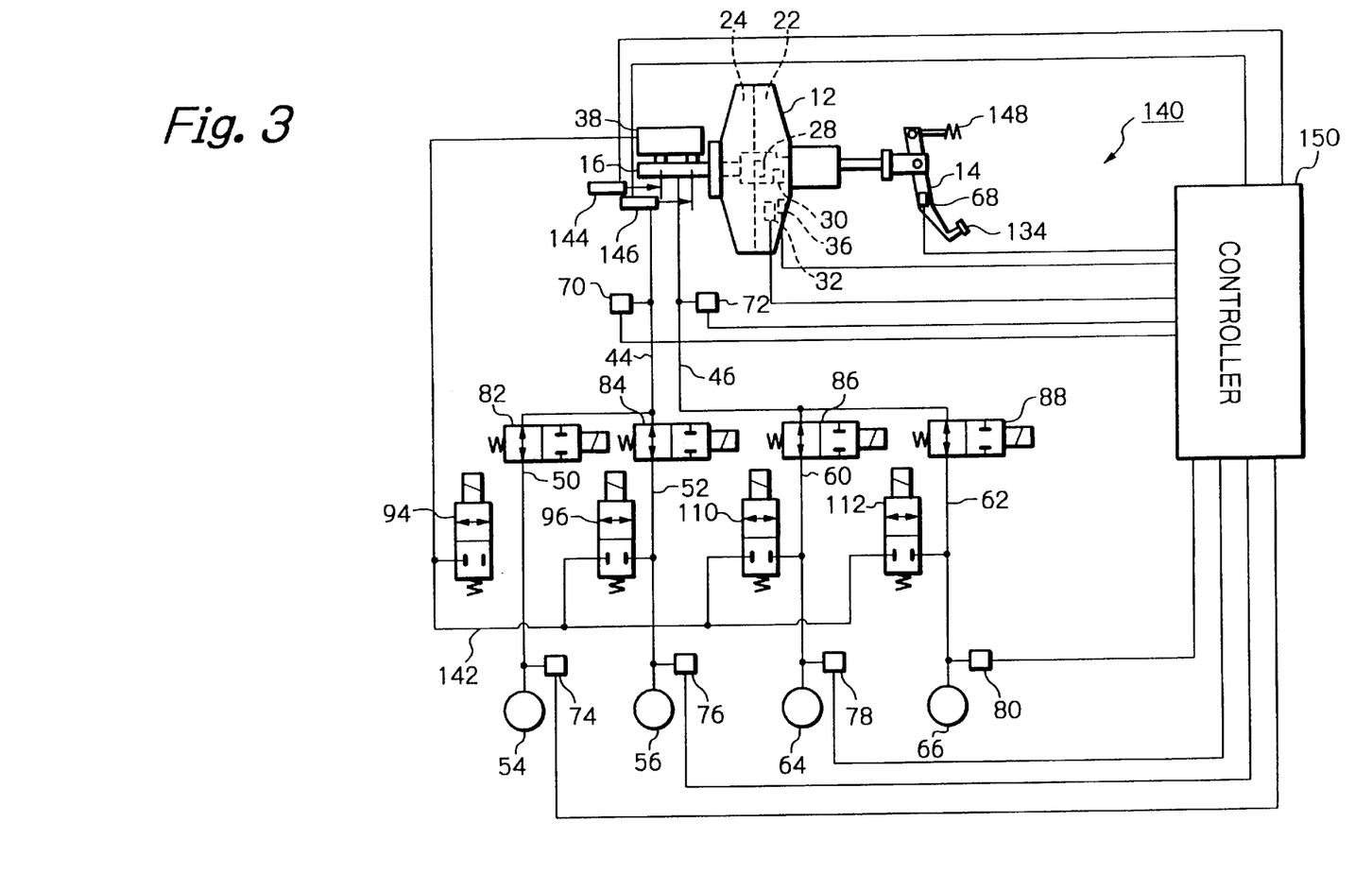
FIG. 3 is a view similar to that of FIG. 1, but showing another embodiment of the brake control system.

Referring next to FIG. 3, there is illustrated a vehicle brake control system made according to another embodiment of the present invention and designated generally as 140. Elements identical to those of the first embodiment are given like reference numerals and will not be described herein.

In this embodiment, the check valves 106, 108, 122, 124 are omitted. To this end, the relief valve 94 has one side connected to the line 50 and the other side connected to a line 142 which emerges from the brake fluid reservoir 38. The valve relief valve 96 has one side connected to the line 52 and the other side connected to the line 142. Similarly, the pressure relief valve 110 has one side connected to the line 60 and the other side connected to the line 142. The pressure relief valve 112 has one side connected to the line 62 and the other side connected to the line 142. With this arrangement, brake fluid in the wheel cylinders 54, 56, 64, 66 is discharged directly to the brake fluid reservoir 38. This embodiment also does not employ the low pressure accumulators 100, 116. In lieu of the stroke sensors 102, 118, two stroke sensors 144, 146 are provided to detect the degree of stroke or displacement of the respective pistons in the master cylinder 16.

The inlet valve 128 and the associated stroke simulator 130 are also absent in this embodiment. Instead, a variable fulcrum mechanism 148 is mounted to the brake pedal 14. The variable fulcrum mechanism 148 is operable to vary the position of fulcrum of the brake pedal 14 so as to effect stroke of the pedal body 134. This gives the operator a "brake feel". In this embodiment, the brake pedal force sensor 68 is mounted within the brake pedal 14.

Figures 4, 4A:
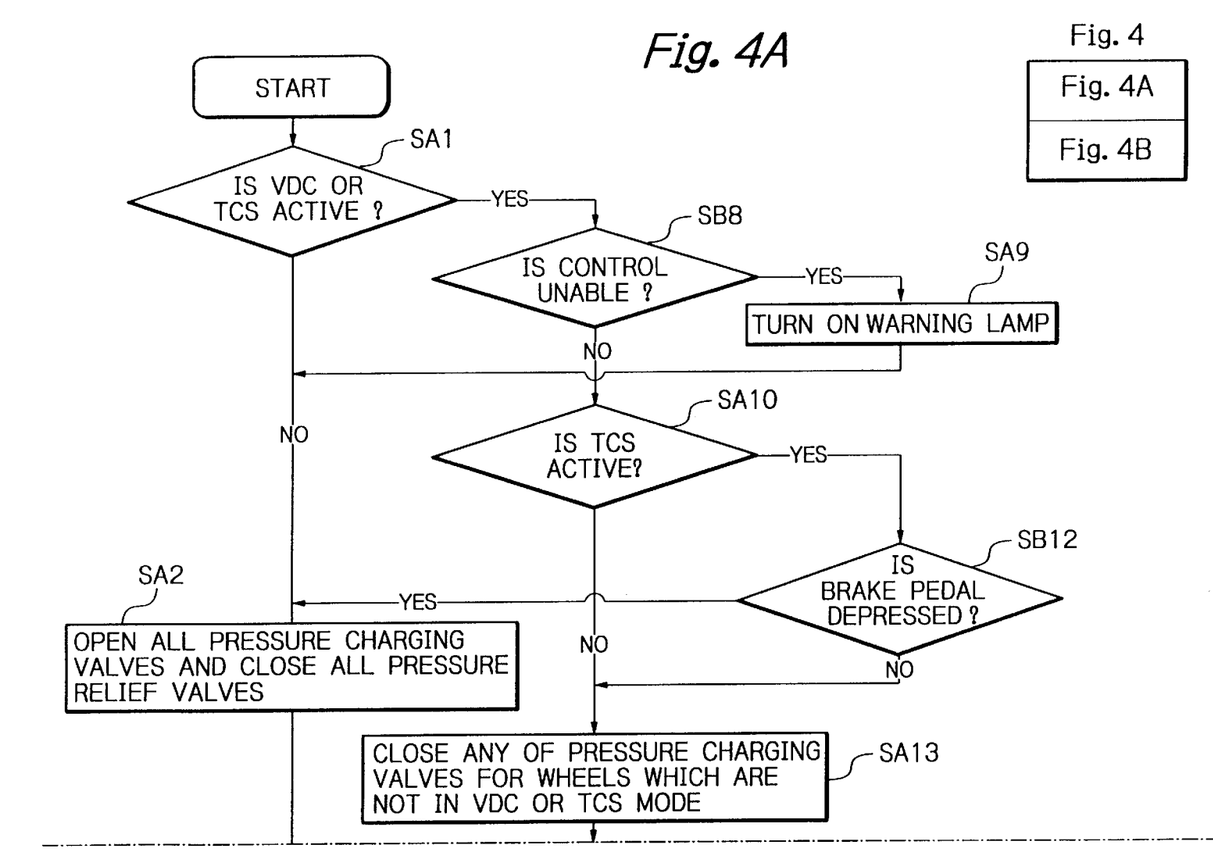
FIG. 4 is a flow chart for control by a controller shown in FIG. 3.
Figure 4B:
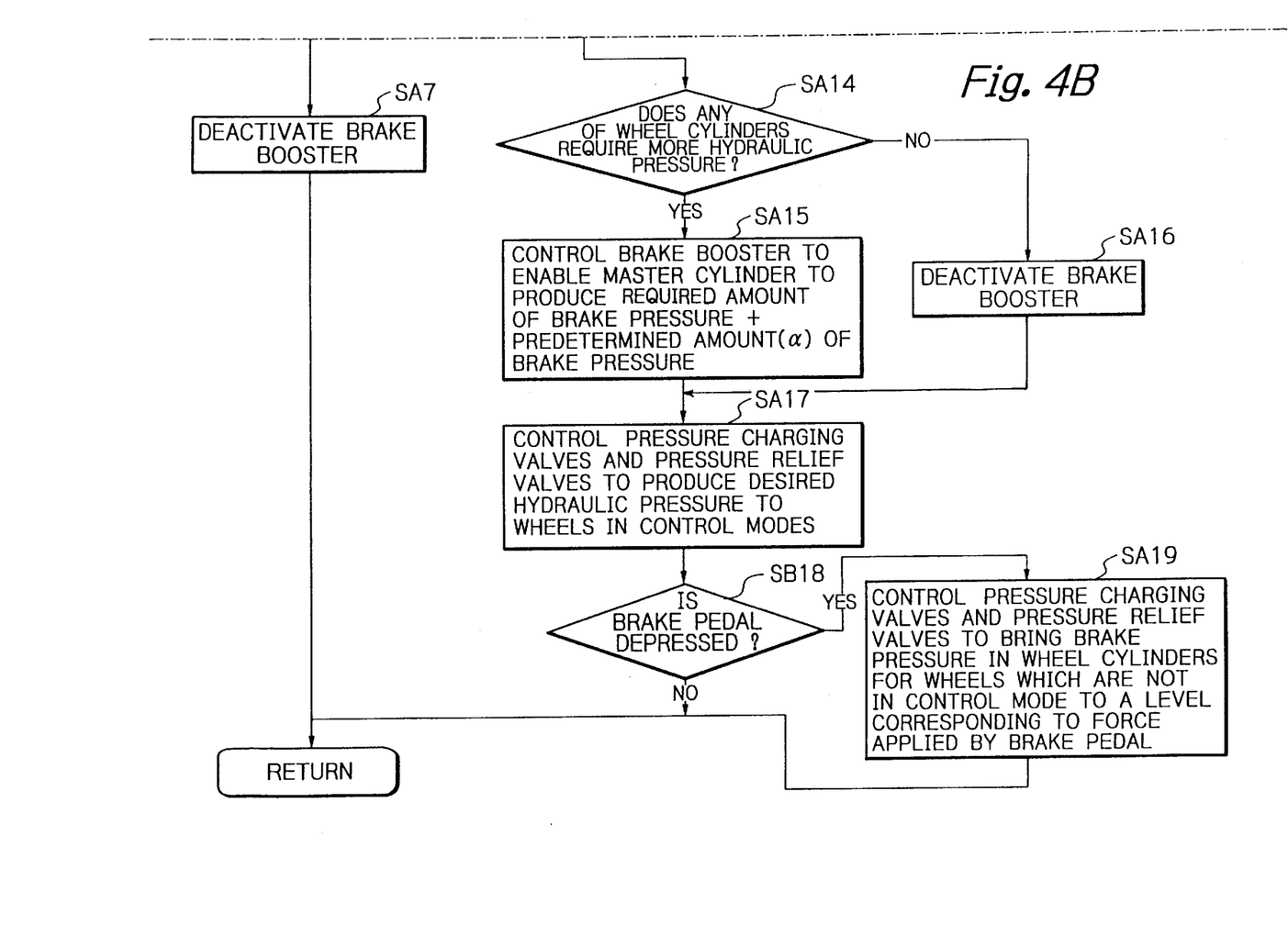

As shown in FIG. 4, the steps SA3, SA4 and SA 11 are omitted since the inlet valve 128 does not exist. Also, the steps SA5 and SA6 are omitted since the low pressure accumulators 100, 116 are absent.

The step SA8 is replaced by a step SB8. Like the step SA8, the step SB8 determines whether or not control is unable to continue. However, this determination is based on the degree of displacement of the pistons (not shown) within the corresponding cylinders in the master cylinder 16, as sensed by the stroke sensors 144, 146. In one example, a controller 150 determines that the control cannot be continued in the case that the pistons are moved to a position corresponding to 40 to 60 percent of the full displacement. Alternatively, the controller 150 may determine that the control cannot be continued when the amount of brake fluid to be fed when either one of the pistons in the master cylinder is moved from the current position to a position corresponding to its full displacement becomes less than the amount of brake fluid required to increase the pressure in a corresponding wheel cylinder to a predetermined level (for example, 60 to 120 bar) or when it is not possible to produce a sufficient braking force.

The steps SA12 and SA18 are replaced by steps SB12 and SA18. Like the steps SA12 and SA18, the steps SB12 and SB18 determine whether or not the brake pedal 14 is depressed. However, this determination is based on the output of the release switch 36 or the brake pedal force sensor 68 mounted within the brake pedal 14.

In this embodiment, brake fluid is discharged to the brake fluid reservoir 38 in a decay mode. The amount of brake fluid discharged in this way is greater than the amount of brake fluid discharged by the use of the low pressure accumulators 100, 116 in the previous embodiment. As such, determination that the control cannot be continued is made much less in this embodiment than in the previous embodiment.

Figure 5:
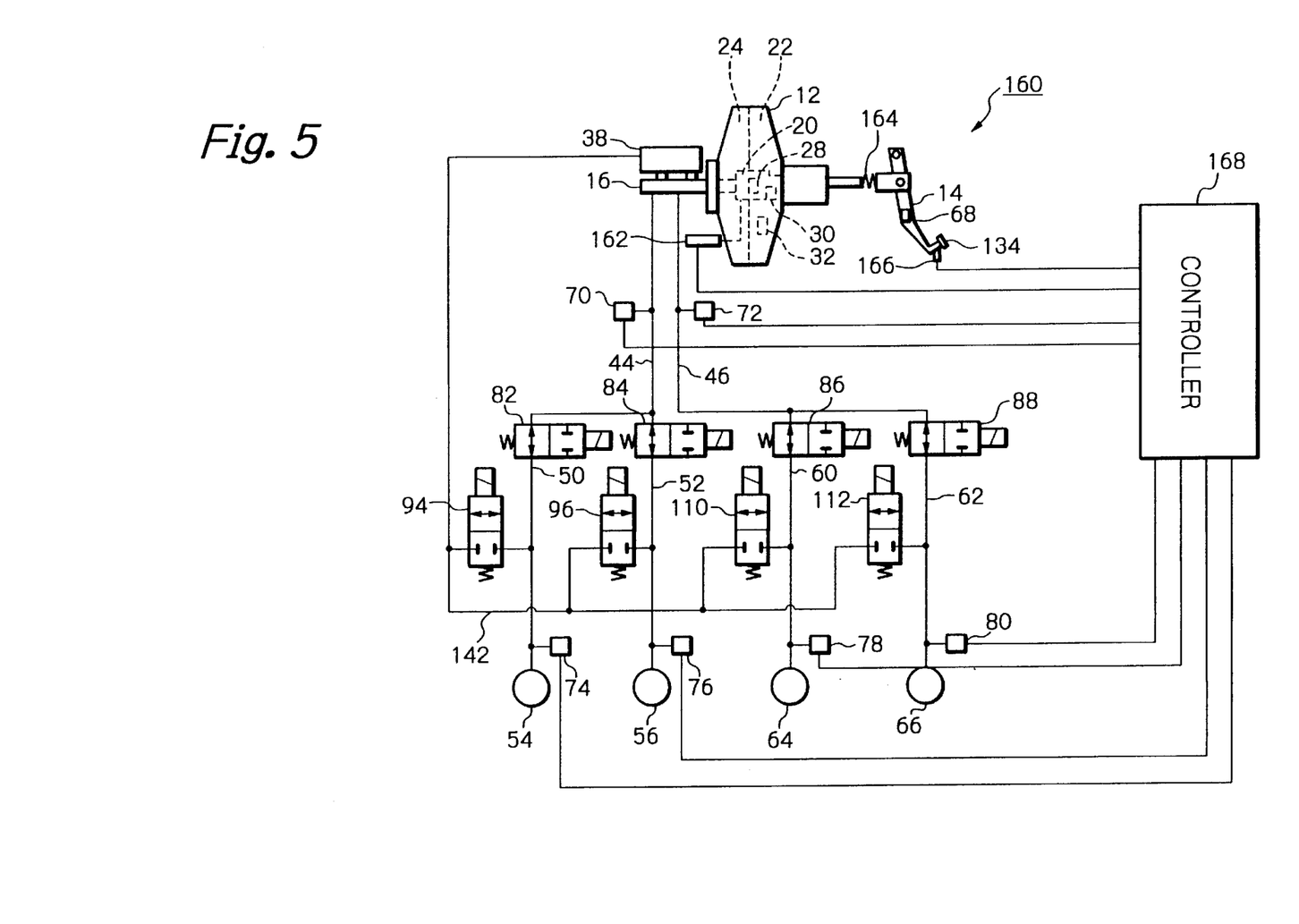
FIG. 5 is a view similar to that of FIG. 1, but showing an alternative embodiment of the brake control system.

Referring to FIG. 5, there is illustrated a brake control system according to a further embodiment of the present invention and designated generally as 160. Like elements to those in the previous embodiments are given like reference numerals and will not be described herein.

The brake control system 160 also does not employ the low pressure accumulators 100, 116 and the check valves 106, 108, 122, 124. Brake fluid in the wheel cylinders 54, 56, 64, 66 is thus discharged to the brake fluid reservoir 38. In lieu of the stroke sensors 102, 118, a stroke sensor 162 is operatively associated with the brake booster 12 so as to detect displacement of the power piston assembly 20.

Also, the inlet valve 128 and the stroke simulator 130 are omitted. Instead, an expansion/contraction mechanism 164 is provided between the brake pedal 14 and the brake booster 12. This mechanism 164 is capable of expansion and contraction in response to operation of the brake pedal 14. This dynamic movement gives a "brake feel" to the operator. As in the embodiment shown in FIG. 3, the brake pedal force sensor 68 is mounted within the brake pedal 14. In lieu of the release switch 36, a foot switch 166 is provided to detect that the foot of the operator is placed on the brake pedal body 134.

Figures 6, 6A:
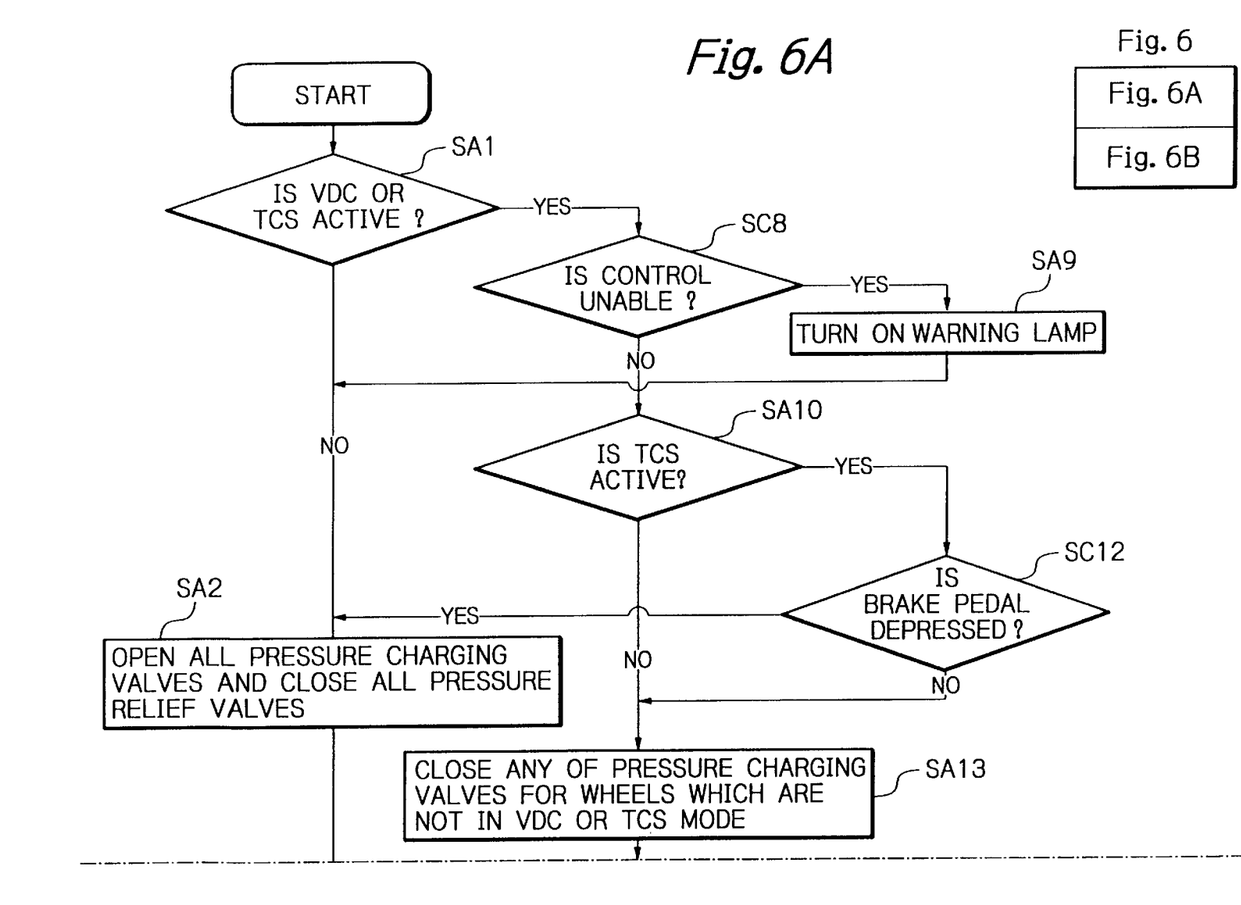
FIG. 6 is a flow chart for control by a controller shown in FIG. 5.
Figure 6B:
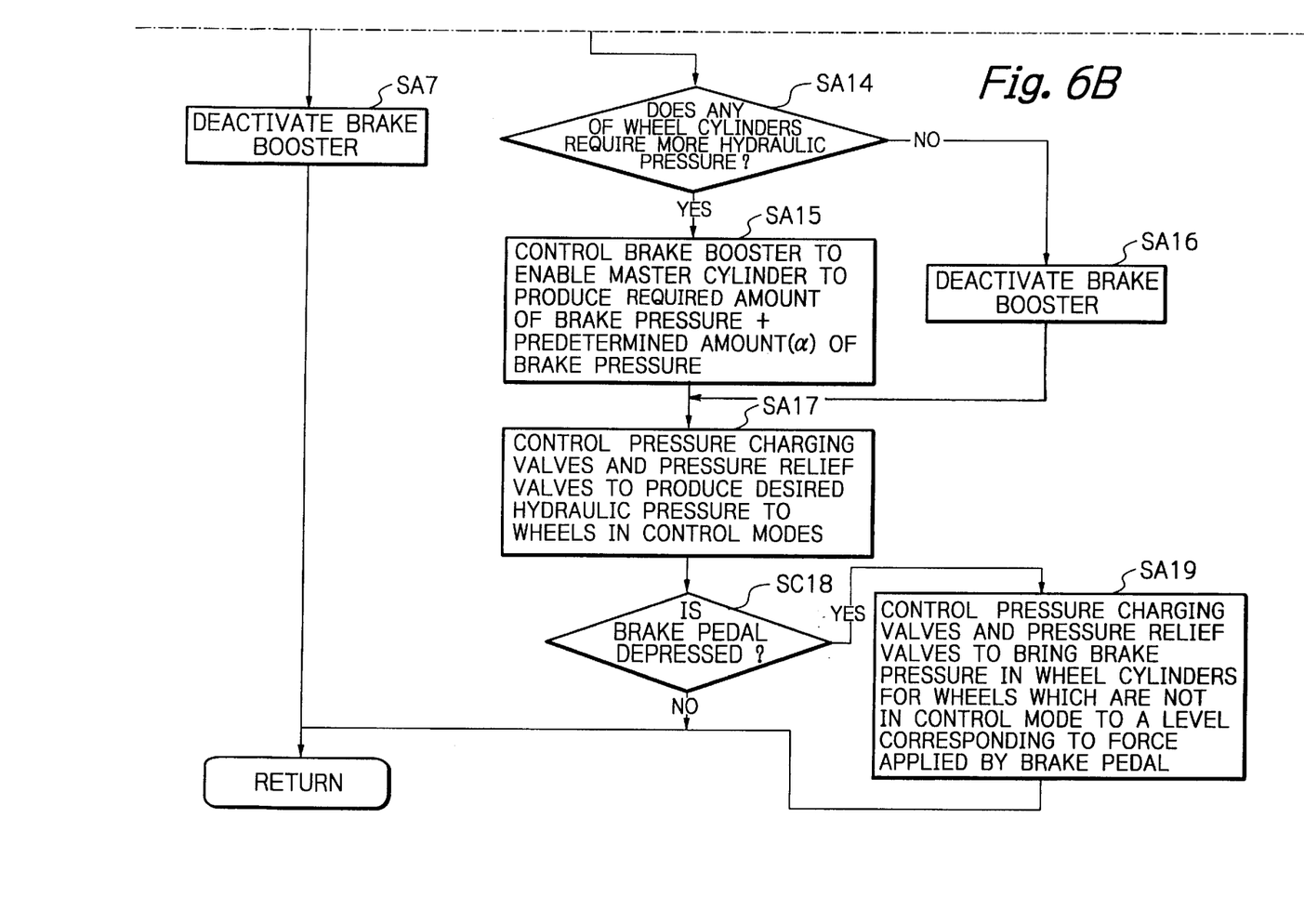

FIG. 6 is a flow chart showing operation of a controller 168 wherein the steps SA4, SA5, SA6 and SA 11 are omitted. The step SA8 is replaced by a step SA8 where it determines whether or not control is unable to continued. This determination is based on the output of the stroke sensor 162. In one example, the controller 168 determines that the control is unable to continue when the power piston assembly 20 is moved to a predetermined position, for example, 40 to 60 percent of its full displacement (that is, when the brake fluid in the master cylinder is completely used up). Alternatively, the controller 168 may determine that the control is unable to continue when the amount of brake fluid to be fed when either one of the pistons in the master cylinder is moved from the current position to a position corresponding to its full displacement becomes less than the amount of brake fluid required to increase the pressure in a corresponding wheel cylinder to a predetermined level (for example, 60 to 120 bar).

The steps SA12 and SA18 are also replaced by steps SC12 and SC18 where they determine whether or not the brake pedal 14 is depressed. This determination is made based on the output of the foot switch 166 or the brake pedal force sensor 68.

In this embodiment, brake fluid is discharged to the brake fluid reservoir 38 in a decay mode. The amount of brake fluid discharged in this way is greater than the amount of brake fluid discharged by the use of the low pressure accumulators 100, 116 in the previous embodiment. As such, determination that the control is unable to be continued (step SC8) is made much less in this embodiment than in the embodiment shown in FIG. 1.

This embodiment employs a single stroke sensor, that is, stroke sensor 162, and is therefore more economical to manufacture than the other embodiments.

Although the present invention has been described with respect to its preferred embodiment, it is to be understood that various modifications, changes and alterations may be made without departing from the spirit and scope of the invention as defined by the appended claims.

What is claimed is:

1. A vehicle brake control system comprising:

a brake booster including an interior and a power piston assembly arranged such that the interior of the brake booster is divided into a constant pressure chamber and a variable pressure chamber selectively communicating with said constant pressure chamber, said brake booster further including a first servo mechanism designed to develop a differential pressure between said constant pressure chamber and said variable pressure chamber in response to operation of a brake pedal to produce a force corresponding to the amount of operation of the brake pedal, and a second servo mechanism;

a master cylinder operatively connected to said brake booster to create hydraulic pressure in response to an output of said brake booster;

a plurality of wheel cylinders for applying a braking force to respective wheels in response to the hydraulic pressure;

a plurality of hydraulic lines connected between said master cylinder and said wheel cylinders;

a plurality of corresponding pressure charging valves provided in said hydraulic lines to allow and to block communication between said master cylinder and said wheel cylinders;

a plurality of pressure relief valves connected to said hydraulic lines between said pressure charging valves and said wheel cylinders;

an accumulator selectively communicating with said wheel cylinders through said pressure relief valves; and a controller designed to control said second servo mechanism, said pressure charging valves and said pressure relief valves, said controller being operable to cause said second servo mechanism to develop a differential pressure between said constant pressure chamber and said variable pressure chamber, regardless of whether or not the brake pedal is depressed, to thereby produce a force greater than that corresponding to the amount of operation of the brake pedal, said controller being further operable to:

open said pressure charging valves and close said pressure relief valves so as to increase a flow of brake fluid from said master cylinder to said wheel cylinders thereby increasing hydraulic pressure applied to said wheel cylinders;

close said pressure charging valves and open said pressure relief valves so as to generate a flow of brake fluid from said wheel cylinders to said accumulator thereby decreasing hydraulic pressure applied to said wheel cylinders; and open said pressure charging valves and open said pressure relief valves so as to generate a flow of brake fluid from said accumulator to said master cylinder.

2. A vehicle brake control system according to claim 1, wherein said controller is operable to control said brake booster, with any of said pressure charging valves for wheels which are not in control mode being closed, to cause said second servo mechanism to produce a force greater than a force normally developed in response to the output of the brake pedal, and control any of said pressure charging valves and said pressure relief valves for wheels in control mode to cause corresponding ones of said wheel cylinders to apply a required amount of braking force to the wheels in control mode.

3. A vehicle brake control system according to claim 1, further comprising a master cylinder hydraulic pressure sensor connected to said controller and adapted to sense hydraulic pressure in said master cylinder, said controller being operable to control said brake booster whereby the hydraulic pressure as sensed by said master cylinder hydraulic pressure sensor is greater than hydraulic pressure required by said wheel cylinders by a predetermined amount.

4. A vehicle brake control system according to claim 1, further comprising check valves connected to bypass said pressure relief valves and allow flow of brake fluid only in a direction from said accumulators toward said master cylinder and said wheel cylinders.

* * * * *